United States Patent [19]

Ruston

[11] Patent Number: 5,566,462
[45] Date of Patent: Oct. 22, 1996

[54] TRUE MAGNETIC COMPASS

[76] Inventor: Fredun Ruston, 79-B Fifth Avenue, Pointe-Claire (Montreal), Quebec, Canada, H9S 5C9

[21] Appl. No.: 377,638

[22] Filed: Jan. 26, 1995

[30] Foreign Application Priority Data

Sep. 15, 1994 [CA] Canada ................................. 2132169

[51] Int. Cl.⁶ ................................................. G01C 17/14
[52] U.S. Cl. ................................ 33/356; 33/349; 33/352
[58] Field of Search ................................. 33/356, 349, 352

[56] References Cited

U.S. PATENT DOCUMENTS

| | | | |
|---|---|---|---|
| 587,954 | 8/1897 | Gathmann | 33/356 |
| 2,411,866 | 12/1946 | Braddon | 33/356 |
| 2,424,254 | 7/1947 | Sawyer | 33/356 |
| 2,464,544 | 3/1949 | Agins | 33/356 |
| 3,210,860 | 10/1965 | Lieberman et al. | 33/356 |
| 3,813,792 | 6/1974 | Jarvenpaa | 33/356 |

FOREIGN PATENT DOCUMENTS

472186  9/1937  United Kingdom ............... 33/356

*Primary Examiner*—Christopher W. Fulton

[57] ABSTRACT

A magnetic compass comprising an arrangement to displace a correcting marker to create a compass correcting coefficient equal to the sum of the variation and the deviation errors effecting the compass so as to counteract the compass error, and to indicate the true course. The correcting marker becomes the steering reference and a vessel is steered so that the correcting marker is aligned with the true course to be steered by the vessel. Repeaters fed from this compass, which repeaters are fed by the hunting between the compass card and the displaceable correcting marker, indicate the true course as well as true bearings. The displacement of the correcting marker can be controlled from a computer programme which displaces the correcting marker in dependence upon the effecting variation and deviation. Thus the magnetic compass shows true course and the repeaters show true course and true bearings automatically.

7 Claims, 7 Drawing Sheets

TRUE MAGNETIC COMPASS

TECHNICAL FIELD

The present invention relates to a magnetic compass in which the errors of variation and deviation effecting the compass are eliminated, resulting in a magnetic compass which indicates the true direction relative to the axial or geographic meridian of the planet.

BACKGROUND ART

The north-south line of the magnetic compass usually does not point along the geographic meridian because:

a) the magnetic poles of the earth are located in a different position from the axial poles, thus causing an angle of error called "variation" on the magnetic compass and b) steel and other magnetic materials cause the lines of force of the earth's magnetism to deviate around a vessel carrying the compass and this results in angles of error on various courses called "deviation" effecting the magnetic compass.

Variation is uncorrected and the mariner allows for the variation. Deviation can be reduced or eliminated by distributing magnets and other soft iron correctors around the compass. Usually a small amount of residual deviation exists and, along with variation, creates an error on the compass.

The uncorrected variation and residual deviation are allowed for by the mariner and the course steered by the compass has an error and is usually different from the true course relative to the axial meridian. The mariner usually finds difficulty in the application of the variation and deviation and this invention (1) makes it easy to correct the variation and deviation effecting the compass, (2) makes it possible to correct the variation and deviation automatically and (3) enables the magnetic compass to show the true, or nearly true, direction relative to the axial meridian of the earth either manually or automatically.

Deviation is caused by many effects, all of which are of magnetic origin, except a part of deviation that can be caused by mechanical means. This part of deviation is caused if the lubber line, or heading, or steering marker is not fixed exactly along or parallel to the fore and aft or keel line of the vessel and it can result in an angle of error called "coefficient A". "Coefficient A" is a part of the deviation effecting the compass. Coefficient A causes an error in the compass equivalent to the angle that the lubber line is displaced from the keel line direction of the vessel.

SUMMARY OF THE INVENTION

In the present invention, it is intended to purposely create a variable correcting angle called a compass correcting coefficient by displacing a movable correcting marker to an amount equivalent to the sum of the known variation and deviation effecting the compass, so that the displacement of the correcting marker compensates for the total error of the compass, thus enabling the magnetic compass to indicate true direction relative to the earth's axial meridian.

It is an object of the present invention to eliminate the errors of variation and deviation effecting the magnetic compass enabling the magnetic compass to indicate the true course relative to the earth's axial or geographic meridian. It is a further object of the present invention to enable the magnetic compass to indicate the true bearings of objects relative to the axial or geographic meridian.

It is a further object of the present invention to enable the unsophisticated mariner to overcome easily the effects of variation and deviation affecting the compass.

It is a further object of the present invention to eliminate the errors of variation and deviation of a magnetic compass by automatic means.

It is a further object of the present invention to enable existing compasses to achieve all of the above objectives.

According to the invention, there is provided a magnetic compass having a correcting marker mounted displaceably on the compass. The correcting marker, mounted displaceably, can purposely create a compass correcting coefficient on the compass. The correcting coefficient created is made equivalent to the sum of the variation and deviation affecting the compass to counteract these errors effecting the compass. An advantage of the correcting marker so displaced is that the correcting marker is now along the true course relative to the axial or geographic meridian direction on the compass and the helmsman or steering man would read the compass at this displaced correcting marker which indicates the true direction and steer the vessel along the true course in relation to the axial or geographic meridian using the correcting marker as steering reference.

According to an aspect of the invention, the correcting marker is marked on a disc for easy displacement and then held in the required displaced position to create the required amount of compass correcting coefficient to counteract the error of the magnetic compass. An advantage of the correcting marker so placed is that the disc can be easily turned and held in place to create the required amount of compass correcting coefficient. A further advantage is that such a disc can also be used on existing compasses.

According to another aspect of the invention, the correcting marker is marked on the compass bowl, the compass bowl being rotatable about the compass to create the required compass correcting coefficient. An advantage of the correcting marker being so marked on the compass bowl is that for repeaters used from the compass, the hunting between the correcting marker on the compass bowl and the compass card becomes easy. Also, the required amount of compass correcting coefficient can be created from a position remote from the compass which would be especially useful for large ships where the magnetic compass is usually located on a deck above the steering position. An advantage also of the displaceable compass bowl is that with some alterations on binnacles of existing compasses these compasses can be made to create the compass correcting coefficient required for counteracting the errors effecting the magnetic compass.

According to another aspect of the invention, the correcting marker is on the binnacle and the binnacle itself is mounted rotatably about the compass to create the required compass correcting coefficient. An advantage of the binnacle being rotatable about the compass is that the smaller compasses used on smaller craft can easily be made to create the required amount of compass correcting coefficient for counteracting the errors effecting the magnetic compass. An advantage also of mounting the binnacle rotatably is that the binnacles of existing compasses can be made rotatable with slight additions to the mounting of the binnacle to create the compass correcting coefficient required for counteracting the errors effecting the magnetic compass.

According to another aspect of the invention, markings can be provided to clearly indicate the direction in which the correcting marker is to be displaced to provide the desired compass correcting coefficient. An advantage in marking the direction for the displacement of the correcting marker is that the mariner can easily apply the required amount of compass correcting coefficient in the correct direction making it easy, especially for the unsophisticated mariner, to eliminate the errors and to use the magnetic compass easily.

According to another aspect of the invention, repeaters are used from the magnetic compass and these repeaters function in dependence upon the hunting between the displaced correcting marker and the compass card. An advantage of this type of hunting between the displaced correcting marker and the compass card is that it enables the repeater to show the true course of the vessel relative to the axial or geographic meridian with the steering marker of the repeater in the same direction as, or parallel to, the keel line of the vessel. This enables the repeater not only to indicate the true course of the vessel, but also the true bearings of objects from the repeater position on the vessel relative to the axial or geographic meridian and these bearings can be plotted on the navigation chart or plan without applying corrections for variation and deviation effecting the magnetic compass. The repeater functions similar to a gyro compass.

According to another aspect of the invention, the variation and/or the deviation effecting the magnetic compass are fed into a computer program and the displacement of the correcting marker is controlled by the computer which displaces the correcting marker to create the counteracting compass correcting coefficient automatically.

The compasses described or claimed in this application can be used on, and extend to, any craft, vehicle or instrument and in particular to any type of water craft, air craft, land vehicle or spacecraft which use magnetic lines of force of the planet to indicate direction and the term vessel includes all of these. A compass is termed as "a magnetic needle turning freely on a pivot" and any mark used as a steering reference can be termed as a correcting marker which may be in a painted form or embossed or projected or reflected or any other form of creating a steering reference on any craft, vehicle or instrument and this invention encompasses any such form of creation of the correcting marker for creation of a compass correcting coefficient. The compass correcting marker may be marked by means of, or on, a pointer, segment, arm, arc, ring, disc, bowl, binnacle or any other means capable of displacing a correcting marker around the compass and the term "disc", or "bowl" or "binnacle" encompasses any such means of displacing the correcting marker. The term repeaters includes bearing and digital repeaters and repeaters used on the autopilot fed from the magnetic compass. Hunting between the compass card and the correcting marker also means hunting between the compass card and a pointer, segment, arm, arc, ring, disc, bowl, binnacle or any other means capable of displacing a compass correcting marker around the compass.

The compasses in the following description are by way of example only while the displacement of the correcting marker to obtain a compass correcting coefficient can be achieved by many different engineering procedures. Accordingly, the invention may be carried into practice in a number of ways and specific compasses embodying the invention will now be described by way of example with reference to diagrammatic drawings.

DESCRIPTION OF THE PREFERRED EMBODIMENTS

Figure 1:
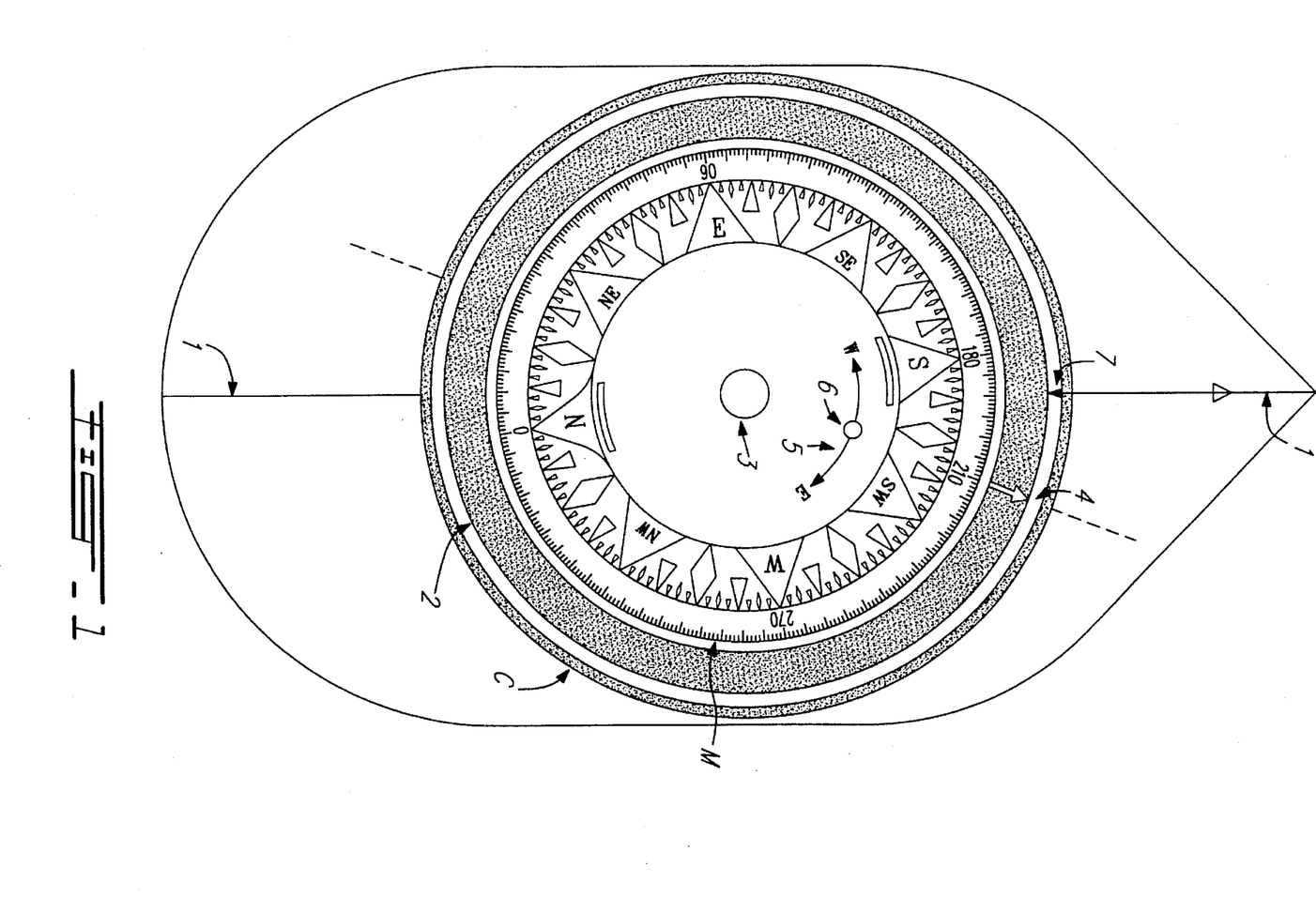
FIG. 1 is a plan view of an example of a magnetic compass on which a disc bearing the correcting marker is rotatably mounted. The disc has markings indicating the direction of displacement and is capable of being held in the required position to provide the required amount of compass correcting coefficient.

In FIG. 1 is shown an embodiment of the present invention in which a vessel, for example, steers a true course of two hundred and ten degrees in a place where the variation is twenty degrees East and the residual deviation is one degree East creating a total error of twenty one degrees East on the compass.

The vessel is propelled along the keel line 1 and the lubber line or steering marker 7 in compasses of prior art would be along the same keel line 1 and show a compass course of one hundred and eighty nine degrees. Thus, while steering a true course of two hundred and ten degrees, the compass course would be one hundred and eighty nine degrees or twenty one degrees different from the true course because of the total error of twenty one degrees East due to the variation and deviation effecting the compass.

In accordance with the present invention, a disc 2 is provided, mounted rotatably on the casing C of the compass around the compass center 3. The compass has a freely rotating magnetic portion M mounted within the casing C with compass bearings on its face. A correcting marker 4 is on the periphery of the disc 2. Directional arrows 5 are also provided on the disc near its center extending to either side of a point 6 located on a radial line extending between the center 3 of the face of the compass and the correcting marker 4.

To steer a true course of two hundred and ten degrees, the mariner first turns the disc 2 in the required direction, east or west as indicated by arrows 5, by an amount equal to the variation error as indicated by the vessel's chart at the vessel's present position. This variation error in the present example is twenty degrees east, so that the disc is turned in the direction of the east arrow 5 to move the correcting marker 4 twenty degrees to a first position from the lubber line 7 which line acts as a reference point for movement of the correcting marker. The vessel is then steered with the desired course of two hundred and ten degrees on the correcting marker. The mariner now notes the compass reading or course at the lubber line 7 of the compass which would be one hundred and ninety degrees. The mariner reads the deviation error for this compass course from the ship's compass deviation card which in the present example is one degree east. The mariner now rotates the disc 2 one degree to the east to place the correcting marker 4 at a second position twenty one degrees to the east of the lubber line 7. The disc is now locked in place. The vessel is now steered with the desired course of two hundred and ten degrees on the correcting marker 4 at its second or correcting position, twenty one degrees east of the lubber line 7. The compass course at this time, shown by the lubber line 7 is one hundred and eighty nine degrees.

The helmsman steers using the now locked correcting marker 4 for reference which shows the true course of two hundred and ten degrees, thus eliminating the errors of variation and deviation effecting the compass in steering. The correcting marker 4 then becomes the effective steering marker.

The arrows 5 on the perspex of the disc show the mariner the direction in which the correcting marker 4 is to be displaced in this example, thus making it easy for an unsophisticated mariner to apply the compass error correctly. A screw arrangement can be provided at point 6 that releases and holds the disc in the required displaced position.

Another way of using the correcting marker 4 would be to first move it, via movement of the disc 2, in either direction from the lubber line 7 to a first position an amount equal to the variation error of the compass at the present location of the vassel. The mariner next reads the deviation error off the ship's compass deviation card for the desired course and moves the disc 2 the desired amount to a second position to cover this error as well. The vessel is now steered with the desired course on the last position of the correcting marker 4. The mariner now checks the compass reading on the lubber line 7 of the compass, notes the deviation from the compass deviation card for the compass reading, and if this deviation error differs from the deviation error read for the desired course, corrects the position of the correcting marker 4 accordingly and sets the vessel on the desired course with the corrected position of the correcting marker.

On vessels that have a small deviation and the variation constitutes almost the total error, the deviation may be neglected and another way of using the correcting marker 4 would be to move it, via movement of disc 2, in either direction from the lubber line 7 to a position an amount equal to the variation error of the compass at the present location of the compass and sets the vessel on the desired course with this corrected position of the correcting marker, ignoring the deviation error. Where the vessel operates locally and the variation remains essentially fixed, the correcting marker could be fixed in the corrected position.

The disc shown in FIG. 1 can be replaced by a ring, pointer, arm, segment, arc, or any device that can displace a correcting marker on the compass. In this example, the degree markings on the compass card are used to displace the correcting marker by the required amount. However, degrees may be marked on the disc to facilitate easy compensation of the compass errors by the creation of the compass correcting coefficient in this manner. The disc of this example can be used on existing compasses.

Figure 2A:
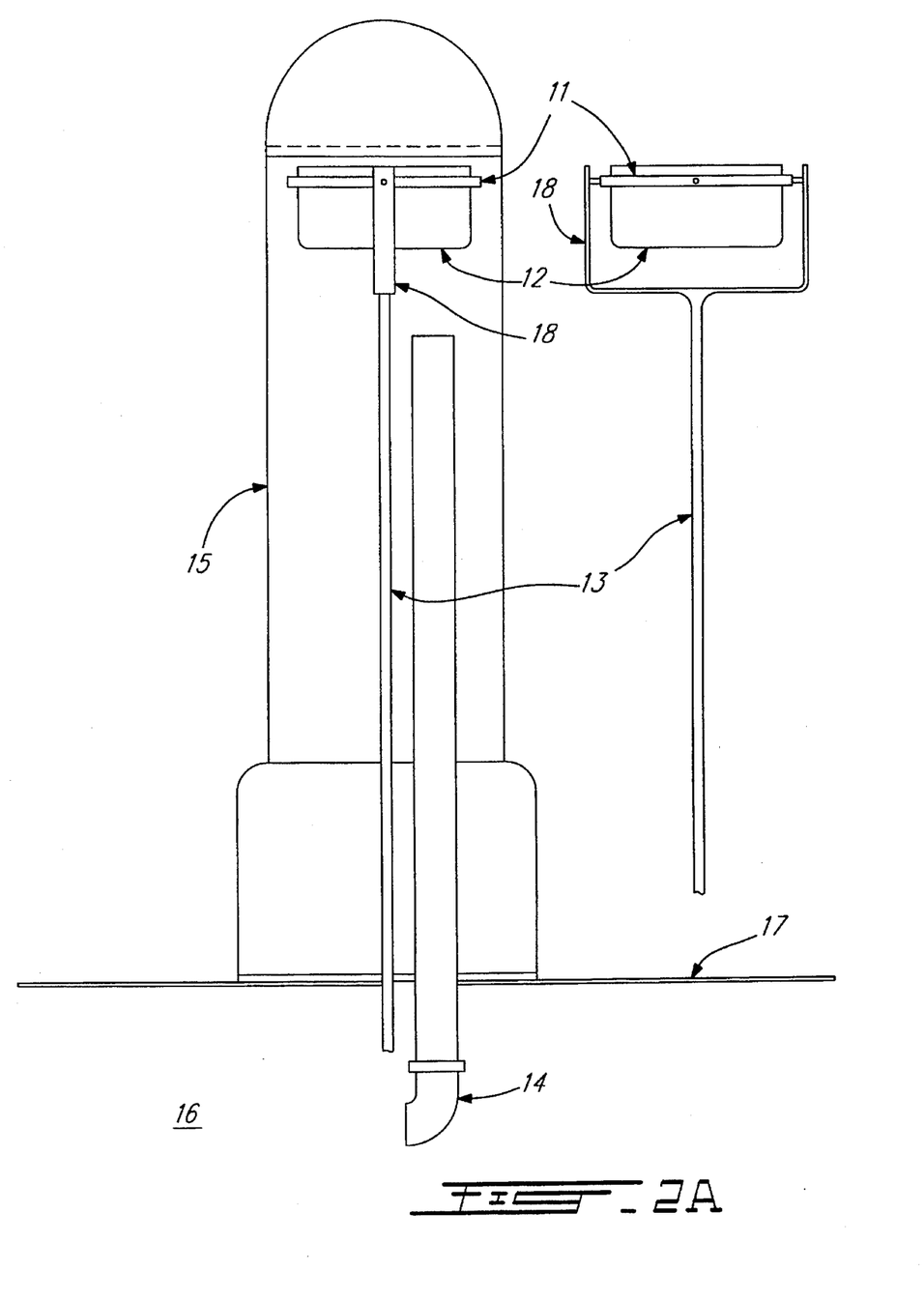
FIG. 2(A) is an elevational view of a part of a compass binnacle in which a magnetic compass bowl is mounted rotatably with the correcting marker attached to the bowl, the displacement of the correcting marker being controlled remotely from the compass.

The magnetic compass is placed on a deck above the steering position on larger vessels and in FIG. 2(A) is shown an example of a part of the binacle housing such a compass.

In an embodiment of the present invention, shown by way of FIG. 2(A) is a compass bowel 12 mounted on gimbals 11. The gimbals 11 are mounted on a frame 18 which is rotatably mounted in the binnacle 15, for example by means of the shaft 13 rotatably mounted in the binnacle and extending to the wheelhouse below through the deck 17. The shaft 13 forms the axis around which the compass bowl 12 is rotated in this example. The rotation and holding of the compass bowl in the required angle displaces the correcting marker, which is attached to the bowl 12, as required to create the compass correcting coefficient to counteract the total of the variation and deviation effecting the compass.

The binnacle, as in prior art, contains a periscope 14 to permit the reading of the compass from the wheelhouse below the deck 17, for example. The periscope 14 may be attached to the shaft 13 for example, so that it rotates around the axis of the compass to facilitate the reading of the compass at the various angles of displacement of the correcting marker by the helmsman at 16. Alternatively, the periscope can be made large enough to encompass the reading of the displaceable correcting marker at the various displacements of the marker. Heeling error correcting magnets can be placed within the hollow shaft 13.

The shaft 13 which carries the compass bowl is controlled from the wheelhouse which is situated below the compass deck 17, for example, and is made to rotate to displace the compass bowl 12 by an amount equal to the total of the variation plus deviation effecting the compass, thus turning the correcting marker along with the bowl to create a compass correcting coefficient to counteract the compass error.

Figures 2B, 2C:
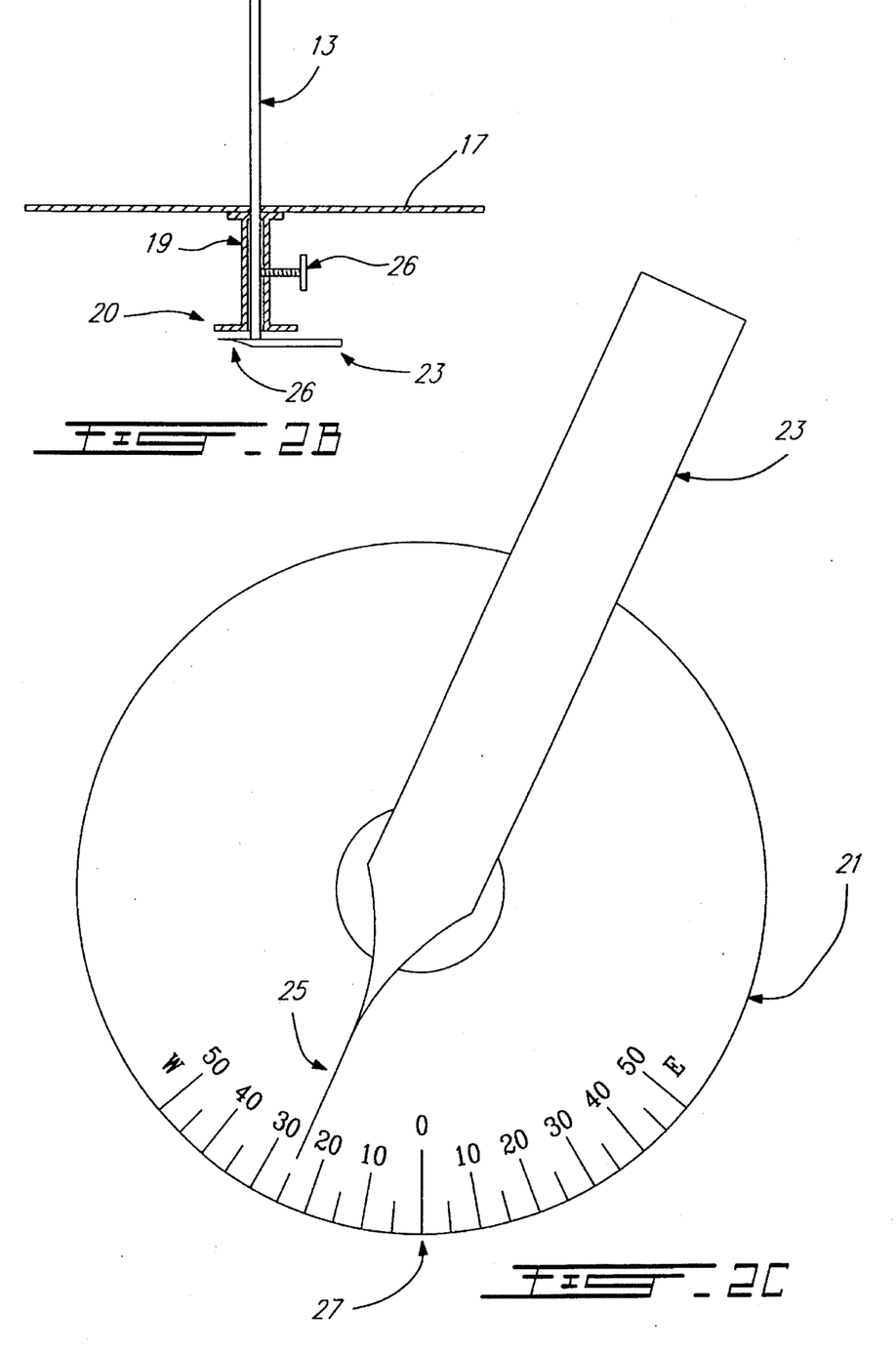
FIG. 2(B) is a detail view showing the mounting of the shaft for the compass bowl.
FIG. 2(C) is a detail view of the dial used in providing the compass correcting coefficient for the compass bowl.

The shaft 13, as shown in FIG. 2(B), is rotatably mounted in the deck 17 by bearings (not shown) and extends below the deck. A sleeve 19 is attached to the bottom of the deck 17 around the shaft. The sleeve has a bottom flange 20 on the bottom surface of which is dial 21. The dial 21 is marked in degrees as shown in FIG. 2(C) to indicate the amount the compass bowl 12 is to be turned around to provide the compass correcting coefficient. A handle 23 having a pointer 25 is attached to the lower end of the shaft 13. The pointer 25 is adjacent the dial 21. The dial 21 also has directions E and W marked to indicate the direction the pointer is to be moved in dependence upon whether the compass error is East (E) or West (W). The handle 23 is used by the mariner to turn the bowl 12 via the shaft 13, to the desired position. A locking screw arrangement 26 is provided that can unlock the shaft for turning and can lock the shaft when the bowl is in the desired position.

Simple additions such as the shaft 13 and frame 18 to existing binnacles can enable the compass bowl bearing the correcting marker to be displaceably mounted for the creation of the compass correcting coefficient for counteracting the errors effecting the compass.

Figure 2D:
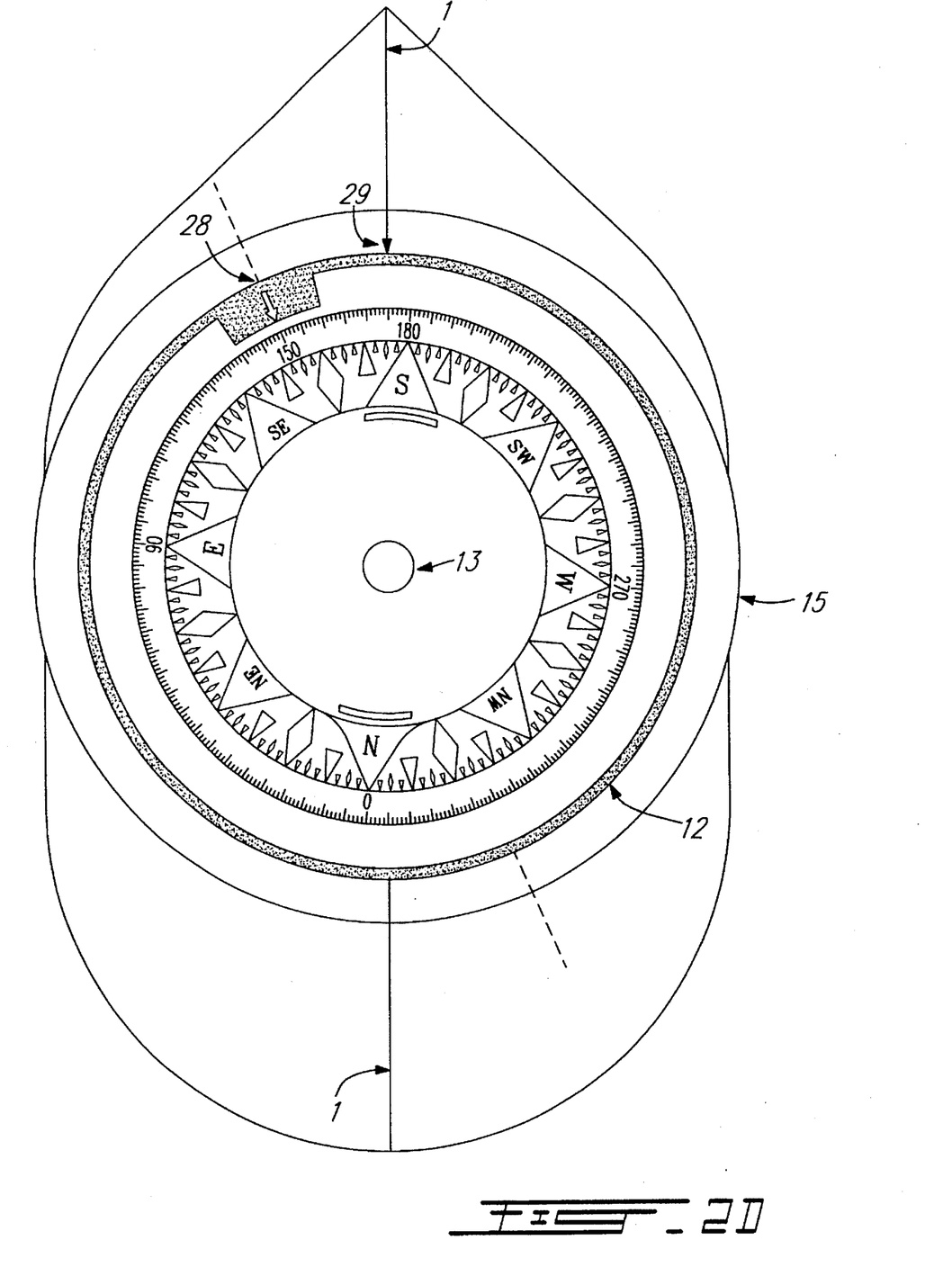
FIG. 2(D) is a plan view of the compass in FIG. 2(A) in which the compass bowl is rotatably mounted inside the binnacle.

FIG. 2(D) is a plan view of the compass contained in the binacle in FIG. 2(A).

The compass bowl 12 within the binnacle 15 is turned around on the axle 13 to counteract a total error of twenty five degrees Westerly on the magnetic compass in the example in FIG. 2(D), that is twenty degrees Westerly variation and five degrees Westerly deviation, for example. The correcting marker 28 is attached inside and onto the compass bowl 12 and the rotation of the bowl 12 by means of the axle 13 displaces the correcting marker 28 by twenty five degrees to counteract the compass error in this example. The bowl 12 is rotated twenty five degrees by turning the handle 23. The twenty five degrees is determined by moving the pointer 25 via the handle from a reference mark 27 on the dial 21.

Thus while the vessel is propelled along the keel line 1, the correcting marker 28 has been displaced by twenty five degrees to counteract the total error of twenty five degrees and the helmsman reads one hundred and fifty degrees, the true course, instead of one hundred and seventy five degrees shown by the lubber line 29.

The turning around and holding in the displaced position of the correcting marker in the above examples can be achieved by simple manual mechanical means or by means of a motor. Such a motor may also be placed inside the binnacle with a short axle 13 and controlled remotely, for example. If a motor is used, additional manual means for displacing the correcting marker can also be provided and also, the motor can be one that operates on batteries for example, so that a failure of the electrical power, for example, should not render the function of displacement of the correcting marker inoperable. The control for displacing the correcting marker is marked with the degrees and directions for applying the compass error. The control may be placed remotely from the compass.

On magnetic compasses repeaters are used and these repeaters also show the compass course which has an error similar to the magnetic compass, that, is the variation plus the deviation effecting the compass. An advantage of the compass arrangement as in this invention is that the hunting for the repeater is done between the displaceable correcting marker and the compass card, for example between the compass card and the correcting marker 28 on bowl 12 in FIG. 2(D). The repeaters then can read the true course along or parallel to the keel line and the fixed steering marker of the repeater is employed instead of a movable correcting marker. The steering marker or lubber line of the repeater is then along the keel line and reads the true course. The compass card in the repeater shows the true direction and this compass card in the repeater then also indicates the true bearings of objects from the repeater position and the vessel's position can be plotted directly on the navigation chart from the bearings obtained without having to apply the corrections for variation and deviation. Thus, the repeater can function similar to a gyro compass, in that the repeater can show the true direction of the head of the vessel as well as being used to obtain the true bearings of objects. Similar to the gyro, the magnetic compass of this invention may have slight error; this error being in dependence upon the accuracy of the variation and deviation applied for the amount of displacement of the correcting marker.

Figure 2E:
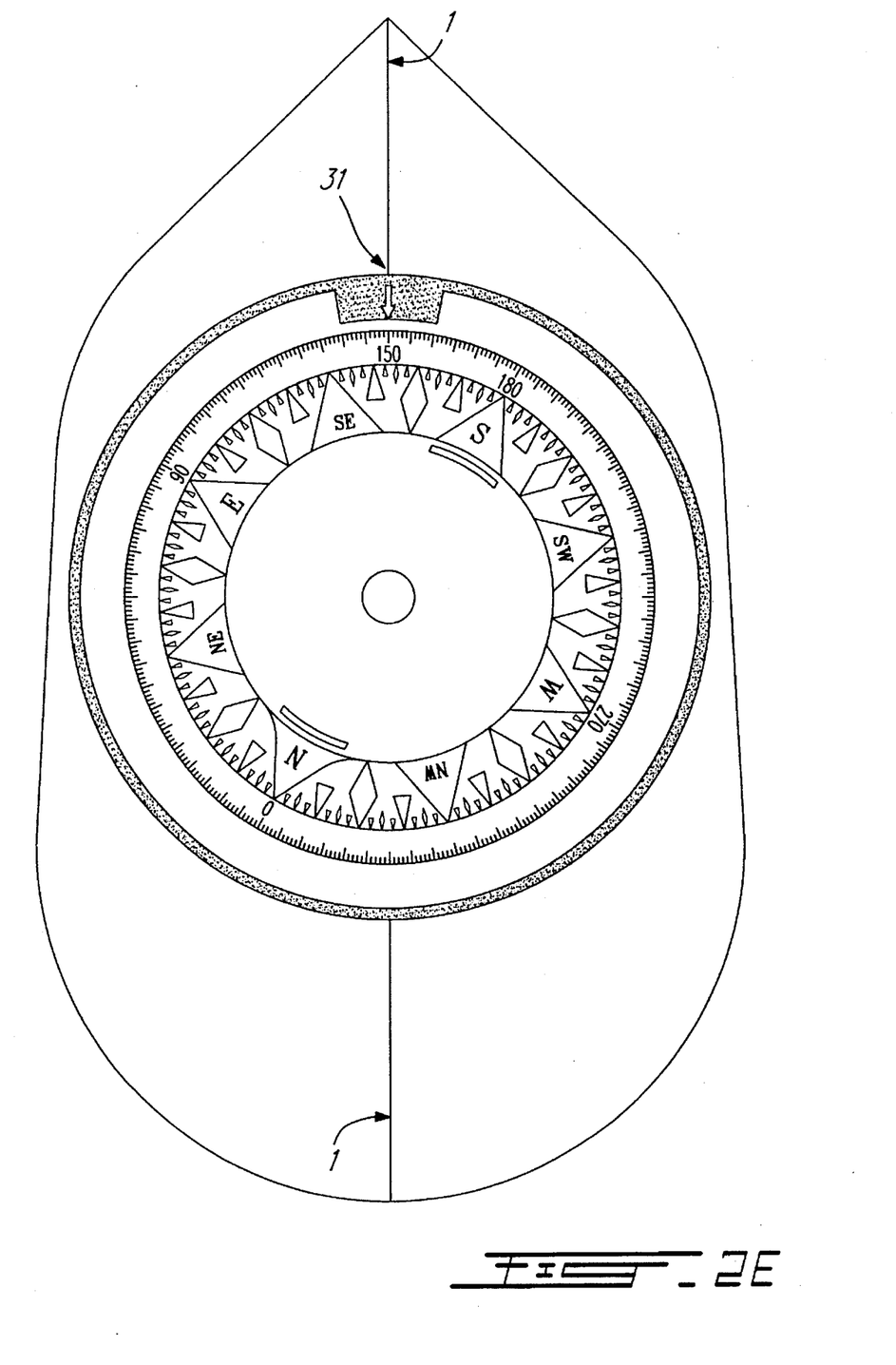
FIG. 2(E) is a plan view of a repeater fed from the compass in FIGS. 2(A) and 2(D).

FIG. 2(E) is a plan view of a repeater fed from the compass in FIGS. 2(A) and 2(D) for example, which is controlled in response to the hunting between the correcting marker 28 on bowl 12 and the compass card in FIG. 2(D). Thus, though the steering marker 31 of the repeater in FIG. 2(E) is along the keel line 1, the compass heading along the steering marker as well as the keel line is the true course of the vessel, that is one hundred and fifty degrees from the axial or geographic meridian and as a result the repeater not only shows the true course relative to the axial meridian, but also, bearings taken from this repeater are true bearings and can be plotted straight off the repeater onto the navigation chart or plan without having to apply the corrections of variation and deviation.

The repeaters too, can be of the type that can function by means of batteries so that in case of power failure on the vessel, the repeaters are operable.

Figure 3A:
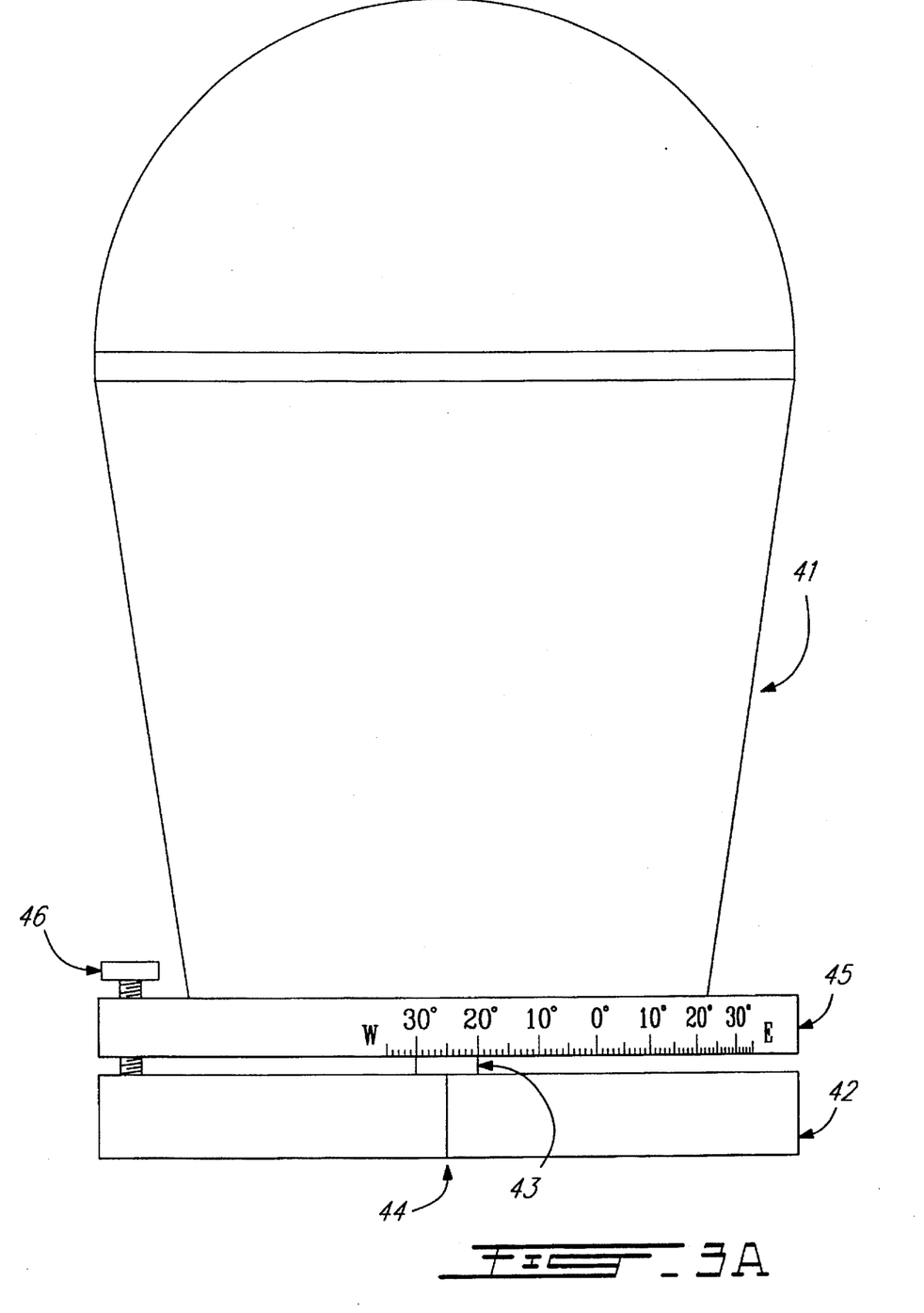
FIG. 3(A) is an elevational view of another type of compass with binnacle in which the binnacle itself is rotatably mounted on a mounting on which the direction of rotation of the binacle to counteract the variation and deviation effecting the compass is indicated.

FIG. 3(A) is an elevational view from the after side of a smaller type of compass with a binnacle 41, commonly used on smaller craft, for example on pleasure craft. For the amateur mariner who finds difficulty in applying the compass error, the direction for the application of the compass correcting coefficient, East (E) or West (W), in dependence on the type of compass error to be overcome, is clearly marked on the base 45 of the binnacle 41 for making it easy to counteract the compass error. In the example in FIG. 3(A) the correcting marker, not shown, is marked on the compass bowl or on the binnacle itself. The keel line or the line parallel to the keel line of the vessel passing through the centre of the compass is marked by the fixed reference marker 44 on the mounting 42. On the base 45 of the binnacle 41 which is rotatably mounted on the mounting 42 there is a dial marking the corresponding degrees by which the correcting marker on the compass bowl or the binnacle is to be displaced by turning the binnacle 41 itself. The zero degree mark on this calibration corresponds to the line passing through the center of the compass and the correcting marker, so that the correcting marker would be displaced by the number of degrees that the zero degree mark on the base 45 of the binnacle 41 is displaced from the fixed reference marker 44 on the mounting 42 of the compass. There is a pivot 43 between the mounting 42 and the base 45 of the binnacle 41 in this example; thus the binnacle 41 can be made to rotate about the pivot 43. A butterfly nut 46 can hold the displaced binnacle in the required position, for example. Thus, when the binnacle 41 is rotated about the pivot 43, the correcting marker on the compass bowl or the binnacle 41 is displaced by an equal amount and can be held in the required position by means of the butterfly nut 46, for example.

In the example in FIG. 3(A) the error is twenty five degrees W, the same as in FIG. 2(D) and the binnacle 41 is displaced by twenty five degrees west in FIG. 3(A), the result being that a plan view of the compass in FIG. 3(A) would be the same as that in FIG. 2(D).

If a repeater is used from the compass in FIG. 3(A), it would have the same results as the repeater in FIG. 2(E).

On an assembly comprising the base 45 of the binnacle and mounting base 42, an existing compass on any craft can also be mounted to enable the compass to create the variable amount of compass correcting coefficient to counteract the variation and deviation effecting the compass.

Figure 3B:
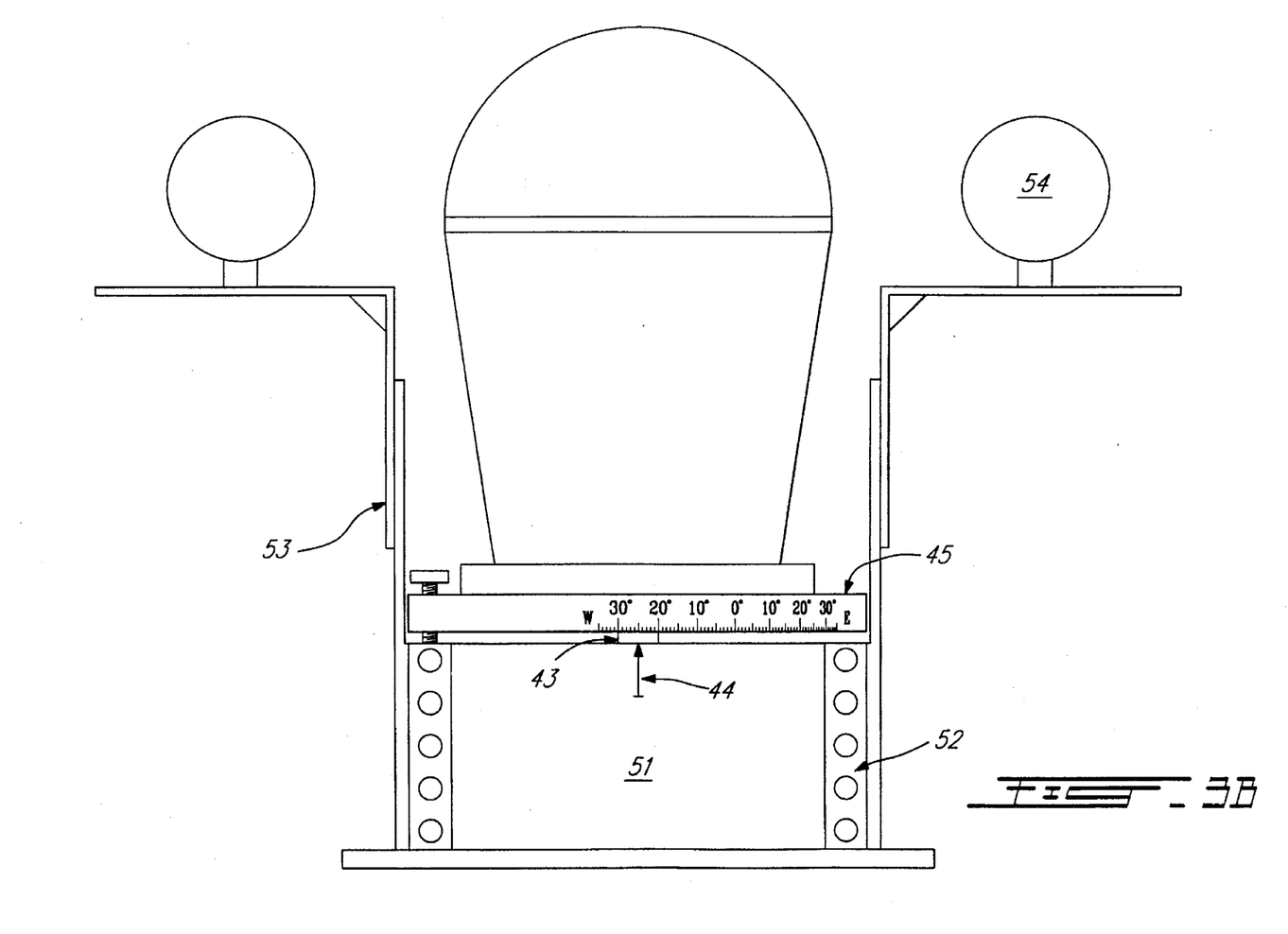
FIG. 3(B) is an elevational view of a mounting similar to the one in FIG. 3(A) but with arrangement for deviation compensating magnets and correctors.

FIG. 3(B) is an elevational view of a mounting for a compass similar to that in FIG. 3(A), which can be fitted on new as well as existing compasses. If the craft is to be used in regions where the variation is small, the compass in FIG. 3(A) with mounting base 42 can be used. However, in regions where the variation is considerable, the binnacle being rotatable would cause the compass correctors to rotate along with the binnacle. The compass correctors for deviation are related to the magnetism of the vessel itself and if rotated would create an effect on the compass different from that intended. Thus, in places where the variation is high or on a craft where the residual deviation is high, the deviation correcters are not placed in or on the binnacle as in FIG. 3(A) but the binnacle without the correctors is mounted on a mounting which mounting base has facility for accepting the deviation correctors. The base 45, the lubber line mark 44 and the pivot 43 in FIG. 3(B) are similar to these in FIG. 3(A).

FIG. 3(B) is an elevational view of such a mounting in which 45 is the base or attachment of the base of the compass or binnacle mounted on mounting base 51, on which holes 52 carry the correcting fore and aft magnets shown and athwartships magnets not shown. As usual, the slots for the magnets would be covered to prevent shifting of the magnets. The arms 53 are adjustable and carry the quadrental correctors 54 and the flinders bar not shown, as and if required.

Such a base and mounting can be used on new or existing compasses to create the compass correcting coefficient required for counteracting the compass errors and repeaters fed from such a compass can also indicate the true heading as well as true bearings.

FIGS. 3(A) and 3(B) are views from behind, that is, from the after side of the compass on a vessel. Therefore the fixed reference mark 44 in FIGS. 3(A) and 3(B) is placed one hundred and eighty degrees from the forward point of the compass. This reference mark 44 can be placed at any angle relative to the keel line of the vessel in such a way that when the zero mark on the base 45 is above the reference mark 44, the correcting marker on the bowl or binnacle of the compass is on the lubber line. Similarly, the fixed reference mark 27 on the dial 21 in FIG. 2(C), can be placed at any angle to the keel line, its function being similar to that of the reference mark 44 in the embodiments in FIGS. 3(A) and 3(B).

In the embodiments in FIGS. 3(A) and 3(B) the lubber line could be marked on the side opposite the mark 44 on the mounting 42, for example, that is, one hundred and eighty degrees from the mark 44 on the mounting 42. Additionally, all the markings shown in FIGS. 3(A) and 3(B) could be made around the forward lubber line position, instead of the after position, if so desired.

In some cases, it is not necessary that the lubber line be physically marked on the compass. All that is required is to have the compass initially set up along the actual lubber line or keel line of the vessel. This is done by having the reference marker aligned with the zero mark on the dial while the correcting marker is on the actual lubber line, or keel line, or a line parallel to the keel line of the vessel.

There are many electronic navigation systems which indicate the position of the vessel, for example, satellite navigation systems, hyperbolic navigation systems, now used in navigation. The variation can be obtained for any position on the surface of the earth or planet from the various geodatic data, including navigation charts. The residual deviation on the compass for various courses can be obtained from the compass adjustment card or by simply swinging the vessel and noting the deviations on the various courses. The vessel's position from the navigation systems, the known variation at the position of the vessel, the course of the vessel from a repeater arrangement and the tabulated deviation is fed into a computer for example, which computer controls the displacement of the correcting marker, as required, to create the required compass correcting coefficient to counteract the variation and deviation effecting the compass. The variation and deviation effecting the compass can then be automatically counteracted and the compasses in the examples in FIGS. 1, 2(A), 2(D), 3(A) and 3(B) show the true direction of the ship's head automatically and the repeater in FIG. 2(E) shows the true direction of both, the ship's head as well as the bearings from the repeater position automatically. Alternatively, the compass may also be semi-automatic in that, the displacement of the steering marker around the compass for deviation may be done automatically by means of a computer program working from a fluxgate switch for example, while the displacement of the steering marker for the variation may be done manually, for example, or vice versa. In these arrangements, the means providing automation may also be operable by means of batteries so that in case of power failure, the compass system of this invention remains functional.

I claim:

1. A navigation steering magnetic compass comprising a casing; a fixed reference mark; a freely rotating magnetic portion rotatable in said casing about the reference mark; compass bearings disposed on the magnetic portion and displaceable therewith; a correcting marker movable about the magnetic portion; said correcting marker being fixed to a rotatably mounted support means which support means is free from said rotating magnetic portion to displace said correcting marker to a corrected position from the reference mark to correct a total compass error; said support means having directional markings on it to show which way said correcting marker should be rotated with respect to said casing to move the correcting marker to correct said total compass error, said total compass error being calculated as the sum of a known variation error and a deviation error affecting the compass, and means for locking said support means and consequently said correcting marker on the corrected position, said casing having a bowl with said magnetic portion of the compass being rotatably mounted within said bowl, said correcting marker being fixed on the bowl which constitutes said support means, means for rotating said bowl on a binnacle, said bowl being mounted by gimbals on a shaft within said binnacle, the shaft being rotatably mounted within the binnacle and having directional markings on it to show which way the shaft should be rotated to move the correcting marker to correct compass error.

2. A method of steering a water craft using a navigation steering magnetic compass on said water craft comprising: determining a total compass error correction required for the compass at the present position of the craft, said total compass error being calculated as the sum of a known variation error and a deviation error affecting the compass; moving a movable correcting marker on the compass from a fixed reference mark on the compass to a corrected position an amount equal to said total error and independent of a freely rotating magnetic portion rotatable in said compass about said reference mark, said correcting marker being displaced in a direction required and equal to said total compass error; and setting the desired course to be steered on the correcting marker at its corrected position.

3. A method as claimed in claim 2 including the steps of: first moving the correcting marker to a first position an amount to correct the variation error of the compass; then moving the correcting marker to a second position an amount to correct the deviation error for the desired course setting; setting the craft on the desired course at the second position of the correcting marker; noting now the course at the reference mark; noting the deviation error of the compass at this course; adjusting the correcting marker if the deviation error at the compass course is different from the deviation error at the desired course; and setting the desired course at the adjusted position, corresponding to the corrected position, of the correcting marker.

4. A method as claimed in claim 3 wherein the reference mark is the lubber line of the compass.

5. A method as claimed in claim 2 wherein a repeating compass takes the desired course reading off the position of the correcting marker on the magnetic compass and shows this course.

6. A method of steering a water craft including the steps of setting the desired course to be steered on the correcting marker at its first corrected position as claimed in claim 2; noting now the course at the reference mark; noting the deviation error of the compass at this course; then moving the correcting marker to a second position to adjust the correcting marker if the deviation error at the compass course is different from the deviation error first corrected and setting the desired course at the second corrected position of the correcting marker corresponding to the second corrected position of the correcting marker.

7. A navigation steering magnetic compass comprising a casing; a fixed reference mark; a freely rotating magnetic portion rotatable in said casing about the reference mark; compass bearings disposed on the magnetic portion and displaceable therewith; a correcting marker movable about the magnetic portion; said correcting marker being fixed to a rotatably mounted support means which support means is free from said rotating magnetic portion to displace said correcting marker to a corrected position from the reference mark to correct a total compass error; said support means having directional markings on it to show which way said correcting marker should be rotated with respect to said casing to move the correcting marker to correct said total compass error, said total compass error being calculated as the sum of a known variation error and a deviation error affecting the compass, and means for locking said support means and consequently said correcting marker on the corrected position, said casing having a bowl with said magnetic portion of the compass being rotatably mounted within said bowl, said correcting marker being fixed on the bowl which constitutes said support means, means for rotating said bowl on a binnacle, said bowl being mounted by gimbals on a shaft within said binnacle, the shaft being rotatably mounted within the binnacle and extending below a deck and carries a pointer, a dial is fixed to the deck adjacent the pointer, and the fixed reference mark being on the dial from which the pointer is moved to move the correcting marker.

* * * * *